April 4, 1939.   C. H. REEVES ET AL   2,153,339
FLOAT
Filed March 4, 1938

Inventor
Charles H. Reeves
and John W. Warden
By Martin E. Anderson
Attorney

Patented Apr. 4, 1939

2,153,339

UNITED STATES PATENT OFFICE

2,153,339

FLOAT

Charles H. Reeves, Denver, Colo., and John W. Warden, El Paso, Tex.

Application March 4, 1938, Serial No. 193,860

4 Claims. (Cl. 43—49)

This invention relates to improvements in floats of the kind used by fishermen.

Many fishermen employ floats on their lines when fishing as these are of assistance, especially when bait is employed instead of flies, and several different kinds of floats are for sale.

The floats now in use are intended merely to support the line and to indicate when a fish bites or nibbles at the bait and the fisherman must set the hook by an appropriate pull on the line at just the right time. Owing to the fact that the floats must be light, they never displace any considerable volume of water and offer very little resistance to the force exerted on the line, by a fish in nibbling at the bait and unless the fisherman gives a pull on the line at exactly the right time the fish will get away.

It is the object of this invention to produce a float of such construction that its weight and volume will be the same as that of an ordinary float made from the same material, but which will offer a greatly increased resistance to a sudden pull tending to submerge the float.

The object pointed out, and any other object or objects that may become apparent as this description proceeds is obtained by means of a construction and an arrangement of parts which will now be described in detail, and reference for this purpose will be had to the accompanying drawing in which the invention has been illustrated in its preferred form and in which:

Figure 6 is a bottom plan view looking in the direction of arrow 6 in Fig. 5.

Figure 1:
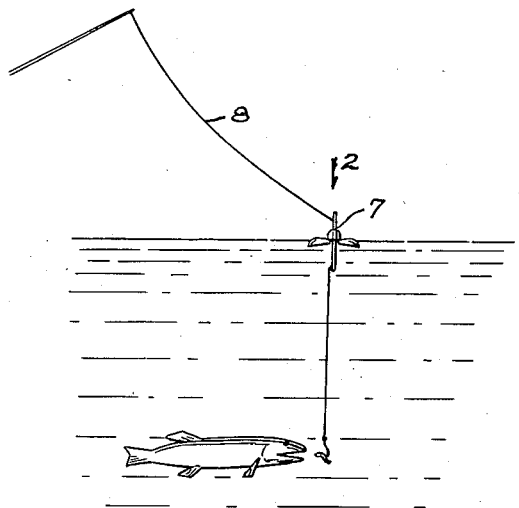
Figure 1 is a view showing the manner in which the float is employed.

In the drawing reference numeral 7 designates the float in its entirety and reference numeral 8 designates the line.

The float, to which this invention relates, comprises a semi-spherical metal center or connecting member 9 having an opening at its pole, in which a grommet 10 is secured. The edge of the center 9 is rolled about a wire 11 which also serves as a hinge pin. The rolled edge is provided with several notches 12 for the reception of the hinge members 13, which in this case are formed from copper or brass strips bent double. The buoyant portion of the float consists of a pear-shaped sectional member 14 which has been separated by three radial cuts into three parts, each of which has been designated by numeral 15. The float members 15 are made from cork or balsa wood, painted or enameled, so as to be waterproof. They may also be made of metal, such as aluminum, and hollow but cork or balsa wood is believed to be the most suitable. The hinge members 13 are inserted into openings in the floats 15 in the manner shown in Fig. 5, from which it will be seen that members 15 can swing about the hinge pin 11 from a position like that shown in Fig. 4 to the position shown in Fig. 3. The material forming the bottoms of the notches 12 serve as stops and engage the hinge members 13 to limit the upward movement of the floats 15.

An upwardly tapered wood pin 16, having an eye 17 at each end, passes through the hole in the grommet, the upper end of the pin is the smaller and is so much smaller than the opening in the grommet that the line 8 can pass without being pinched. The lower end of pin 16 is slightly larger in diameter than the hole in the grommet and it is therefore possible to adjust the position of the float on the line by pulling the pin downwardly until the line is released, the latter can then be pulled through the eyes 17 to bring the float to the desired position, after which the pin is moved upwardly until it pinches the line against the side of the opening in the grommet.

Figure 2:
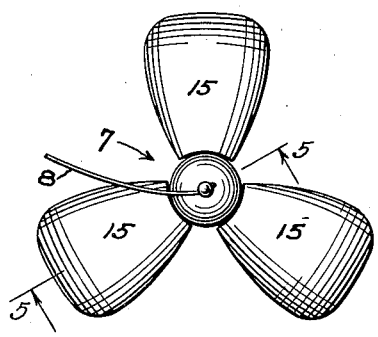
Figure 2 is a top plan view of the float, looking in the direction of arrow 2 in Fig. 1, and shows the float open.
Figures 3, 4:
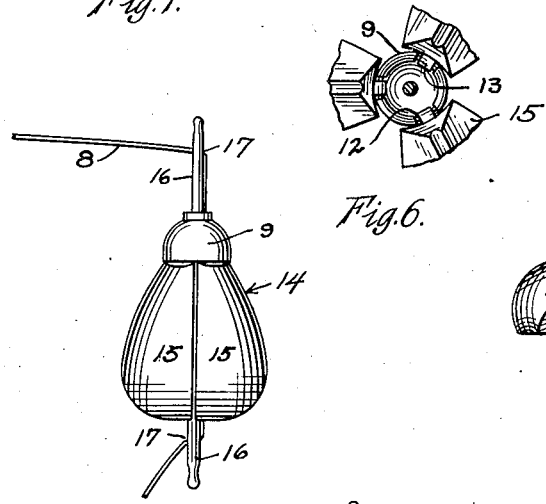
Figure 3 is a side elevation of the float, showing the same open.
Figure 4 is a side elevation of the float showing the same closed.
Figure 5:
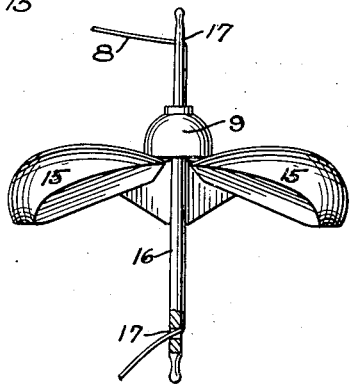
Figure 5 is a section taken on line 5—5 Fig. 2.

When the float is not in use the parts assume the position shown in Fig. 4 and it then resembles an ordinary cork float. When the float is in use, as in Fig. 1, the float members 15 spread outwardly into the position shown in Figs. 1, 2 and 3. The area of buoyant surface exposed to the water is much greater than would be the case with a solid float of the same size and shape shown in Fig. 4. With the large surface in contact with the water the float offers a powerful resistance to any downward pull tending to submerge it and therefore, when a fish "bites" or nibbles at the bait the line will offer sufficient resistance to "set" the hook with the result that a much larger proportion of the fish that "bite" will be hooked. As above pointed out, when no float is used, or when an ordinary float is used, it is necessary for the fisherman to keep very close watch and to give a jerk of just the right strength and at just the right instant, in order to "set" the hook.

With the present float the skill of the fisherman may be less and better results obtained.

After the fish is caught the spread float offers a much greater resistance to a force tending to pull it into and through the water, with the result that a large fish can be more easily tired and landed.

Attention is called to the fact that the under surfaces of floats 15, taper downwardly and therefore the volume of water displaced increases at a fast rate as the float is moved deeper into the water.

The float can be used as an ordinary float by putting an elastic band or a string around the members 15 when the parts are as in Fig. 4.

The hinged construction permits the floats to fold when not in use and to spread automatically when in place on the water.

Having described the invention what is claimed as new is:

1. A float comprising a central connecting member, a plurality of elongated buoyant members of sector-shaped cross section, having straight angularly related sides, hinged at their upper ends to the connecting member, the straight sides being parallel when the members are in normal position, the several members being movable through an angle of substantially 90 degrees, into a radiating position, and means for limiting the movement to substantially 90 degrees.

2. A float comprising in combination, a central connecting member having a plurality of angularly spaced hinge pins arranged in a circle, an elongated float member of sector-shaped cross section, having angularly related flat sides connected to each hinge pin for movement thereabout, the float members being normally parallel with their flat sides opposed to each other, and movable about their hinge pins through an angle of about 90 degrees in which position the axes of the float members radiate from the connecting member, and stop means for limiting the movement of the float members to substantially 90 degrees.

3. A float comprising in combination, a plurality of elongated buoyant float members having sector-shaped cross sections, having angularly related flat sides, the members being normally parallel with their flat sides in contact whereby a solid of revolution is formed, a central hinge member positioned at one end of the float members, hinge elements attached to each float member and operatively connected with the central hinge member, the several float members being movable from parallel position to a radiating position, means for limiting the hinged movement to substantially 90 degrees and means for attaching a line to the central hinge member.

4. A float having a central member with a substantially semi-spherical outer surface, having a plurality of hinge pins equidistantly arranged about its edge, and an opening at its pole, buoyant float members hingedly connected with the hinge pins for movement from a position perpendicular to the equatorial plane of the central member to a radiating position parallel with the equatorial plane, a line passing through the opening and means for wedging the line in the opening to fasten the float thereto.

JOHN W. WARDEN.
CHARLES H. REEVES.